United States Patent
Araki

(10) Patent No.: US 6,725,192 B1
(45) Date of Patent: Apr. 20, 2004

(54) AUDIO CODING AND QUANTIZATION METHOD

(75) Inventor: Tadashi Araki, Kanagawa (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 09/333,054

(22) Filed: Jun. 15, 1999

(30) Foreign Application Priority Data

Jun. 26, 1998 (JP) .......................................... 10-180676
May 12, 1999 (JP) .......................................... 11-130751

(51) Int. Cl.$^7$ .............................................. G10L 19/00
(52) U.S. Cl. ..................... 704/230; 704/500; 704/200.1
(58) Field of Search ................................ 704/500, 501, 704/502, 503, 704

(56) References Cited

U.S. PATENT DOCUMENTS

| | | | | |
|---|---|---|---|---|
| 5,649,053 A | * | 7/1997 | Kim | 704/229 |
| 5,887,187 A | * | 3/1999 | Rostoker et al. | 712/29 |
| 5,893,066 A | * | 4/1999 | Hong | 704/500 |
| 6,081,783 A | * | 6/2000 | Divine et al. | 704/500 |
| 6,104,996 A | * | 8/2000 | Yin | 704/500 |
| 6,138,051 A | * | 10/2000 | Dieterich | 700/94 |
| 6,349,284 B1 | * | 2/2002 | Park et al. | 704/500 |

FOREIGN PATENT DOCUMENTS

JP 7-154266 6/1995

OTHER PUBLICATIONS

ISO/IEC 11172–3 Standard, 1993, pp. 30–44,66–75.*
Morris, "MPEG–2: Where did it come from?", 1995 IEEE, pp 1–5.*
Stoll, "MPEG Audio Layer II: A Generic Coding Standard for two and multichannel sound for dvb,dab, and computer multimedia", International Broadcast convention, Sep. 14–18, 1995, pp 136–144.*
Hans et al, "A Compliant MPEG–1 Layer II Audio Decoder with 16–B Arithmetic Operations", IEEE Signal Processing Letters, vol. #4, May, 1997.*

* cited by examiner

Primary Examiner—Richemond Dorvil
Assistant Examiner—Michael N. Opsasnick
(74) Attorney, Agent, or Firm—Dickstein Shapiro Morin & Oshinsky LLP

(57) ABSTRACT

In an audio coding and quantization method, each of spectral subband components of an audio signal is quantized whereby a quantizer step size for a related one of spectral subbands is obtained from a bit allocation. The bit allocation is controlled for each subband by using a psychoacoustic model. During the controlling, a quantization of frequency domain values of a related one of blocks is calculated through a first control loop, the first control loop being repeated until a bit rate requirement is met. A quantization noise for each subband, produced within the first control loop, is calculated through a second control loop, the second control loop being repeated until a masking requirement is met. The first control loop and the second control loop are alternately performed for the related block such that both the requirements are met, and, thereafter, an output vector of quantized frequency domain values is finally produced.

14 Claims, 10 Drawing Sheets

AUDIO CODING AND QUANTIZATION METHOD

BACKGROUND OF THE INVENTION (1) Field of the Invention

The present invention relates to an audio coding and quantization method which is appropriate for various applications including the fields of audio signal storage, communication and broadcasting applications.

(2) Description of the Related Art

Digital representations of analog waveforms introduce some kind of distortions. A basic problem in the design of source coders is to achieve a given acceptable level of distortion with the smallest possible encoding bit rate. To reach this goal the encoding algorithm must be adapted both to the changing statistics of the source signal and to auditory perception. Auditory perception is based on critical band analyses in the human ear. The power spectra are not represented on a linear frequency scale but on the frequency bands, called critical bands, with bandwidths on the order of 100 Hz below 500 Hz and with increasing bandwidths (up to 500 Hz) at high signal frequencies. Within critical bands the intensities of individual tones are summed by the ear. Up to 20,000-Hz bandwidth 26 critical bands have to be taken into account. Audio coders that exploit auditory perception must be based on critical-band structured signal processing.

Auditory masking describes the effect that a low-level audio signal (called the maskee) can become inaudible when a louder signal (called the masker) occurs simultaneously. The effect of simultaneous masking and temporal masking can be exploited in audio coding by transmitting only those details of the signal which are perceptible by ear. Such coders provide high coding quality without providing high signal-to-noise ratios.

Hereinafter, the lower limit of a sound pressure level from which any signal will not be audible due to the masker is called a masking threshold. It is also known as a threshold of just noticeable distortion in the context of source coding.

Generally, audio signals in the vicinity of 4 kHz are very perceptible by the human ear regardless of whether the masker is present. Hereinafter, the lower limit of a sound pressure level that is audible to the human ear is called an absolute hearing threshold. It is also known as a threshold in quiet.

FIG. 6 shows a relationship between the absolute hearing threshold and the masking threshold in a spectral distribution of audio signal.

Without a masker, an audio signal (A) (indicated by the solid line in FIG. 6) is inaudible if its sound pressure level is below the absolute hearing threshold (C) (indicated by the two-dot chain line in FIG. 6) which depends on frequency. The sound pressure level that is equal to 0 dB relates to a sound pressure of 0.02 mN/m². In the presence of a masker, the masking threshold (B) (indicated by the dotted line in FIG. 6) can be measured below which any signal will not be audible. The masking threshold depends on the sound pressure level, the frequency of the masker, and on the characteristics of masker and maskee.

In addition to simultaneous masking of one sound by another one occurring at the same time, temporal masking occurs when two sounds appear within a small interval of time; the stronger one masks the weaker one, regardless of whether the latter one occurs before or after it. Temporal masking can be used to mask pre-echoes caused by the spreading of a sudden large quantization error over the actual coding block.

The effect of simultaneous masking and temporal masking can be exploited in audio coding by transmitting only those details of the signal which are perceptible by ear. It is equivalent to a bit allocation by which the necessary bits for encoding the bitstream are allocated to only the portions of the audio signal (A) which are above the masking threshold (B) and the absolute hearing threshold (C). In the audio coding, the audio signal is divided into a number of spectral subband components (D) (indicated by the one-dot chain lines in FIG. 6) and each component is quantized whereby the number of quantizer levels for each component is obtained from the bit allocation.

The width of each subband component (D) is equivalent to the bandwidth of the audio signal. In each subband the signal component the intensity of which is below a certain lower limit will not be audible. As long as the difference in intensity between the source signal and the decoded signal is below the lower limit, the decoded signal will be indistinguishable from the source signal. Hereinafter, the lower limit of a sound pressure level for each subband is called an allowed distortion level. In the context of audio coding, if the level of a quantization error produced by the quantization of an audio signal is below the allowed distortion level, the audio coding can provide high coding quality without providing high signal-to-noise ratios. The bit allocation for each subband component (D), as shown in FIG. 6, is equivalent to controlling the quantization of the audio signal such that the quantization error level for each subband is exactly equal to the allowed distortion level.

As disclosed in Japanese Laid-Open Patent Application No. 7-154266, an audio coding and quantization algorithm for digital audio signals is known. In the audio coding method of the above publication, a digital audio signal is converted into blocks of spectral data, and each block is divided into units of normalized coefficients. An upper limit of the number of bits allocated per block is fixed. The bit allocation is controlled by using the fixed upper limit. For the blocks with the number of needed bits that exceeds the upper limit of the number of allocated bits, the normalized coefficients of the related unit are forcefully corrected so that the numbers of needed bits for all the blocks are below the upper limit.

International Standard ISO/IEC 13818-7 provides a generic audio coding and quantization algorithm for digital audio signals. In the audio coding and quantization method of this standard, it is difficult to speedily carry out an iterative process that converges when the total bit count is within some interval surrounding the allocated bit count, while preventing the degradation of coding quality due to nonconvergence. If both a bit rate requirement and a masking requirement are not finally met, it is likely to cause the degradation of coding quality. Further, in the above-described method of International Standard ISO/IEC 13818-7, when the check of the masking requirement is done, the quantization error levels of all the subbands are not always less than the allowed distortion levels. Even if both the bit rate requirement and the masking requirement are finally met, it requires a relatively large computing time until the convergence is reached. As long as the masking requirement is not met, the bit allocation control must be repeated many times. The repeated bit allocation control includes some redundant processes.

In the conventional method of the above publication (Japanese Laid-Open Patent Application No. 7-154266), the same problem remains unresolved. It is difficult to speedily carry out the iterative process that converges when the total bit count is within some interval surrounding the allocated bit count, while preventing the degradation of coding quality due to nonconvergence.

SUMMARY OF THE INVENTION

An object of the present invention is to provide an improved audio coding and quantization method in which the above-described problems are eliminated.

Another object of the present invention is to provide an audio coding and quantization method which is effective in speedily carrying out an iterative process that converges when the total bit count is within some interval surrounding the allocated bit count, while preventing the degradation of coding quality due to nonconvergence.

Still another object of the present invention is to provide an audio coding and quantization method which is effective in providing high coding quality without providing high signal-to-noise ratios.

The above-mentioned objects of the present invention are achieved by an audio coding and quantization method which includes the steps of: converting each of blocks of an input audio signal into a number of spectral subband components, the blocks being produced from the signal along a time axis; converting a related one of the blocks into an input vector of frequency domain values; quantizing each subband component whereby the number of quantizer levels for a related one of spectral subbands is obtained from a bit allocation; controlling the bit allocation for each subband by using a psychoacoustic model which generates an allowed distortion level of a related one of scalefactor bands corresponding to the subbands; calculating, during the controlling step, a quantization of the frequency domain values of the related block through a first control loop, the first control loop being repeated until a bit rate requirement is met that a count of bits needed to encode a bitstream is less than a predetermined count of bits available to encode the bitstream; and calculating, through a second control loop, a quantization noise for each subband, produced by the quantization of the frequency domain values within the first control loop, the second control loop being repeated until a masking requirement is met that a quantization error level of the frequency domain values with scalefactors applied to the values within the scalefactor bands is less than the allowed distortion level, wherein the first control loop and the second control loop are alternately performed for the related block such that both the bit rate requirement and the masking requirement are met, and, after both the requirements are met, an output vector of quantized frequency domain values is finally produced.

According to the audio coding and quantization method of the present invention, when controlling the bit allocation for each subband, the first control loop and the second control loop are alternately performed for each block such that both the bit rate requirement and the masking requirement are met. After both the requirements are met, an output vector of quantized frequency domain values is finally produced. A total number of executions of the loop processes needed to optimize the bit allocation is remarkably reduced, and it is possible to speedily reach the convergence. Therefore, the audio coding quantization method of the present invention is effective in providing high coding quality without providing high signal-to-noise ratios. It is possible to speedily carry out the iterative process that converges when the total bit count is within some interval surrounding the allocated bit count, while preventing the degradation of coding quality due to nonconvergence.

BRIEF DESCRIPTION OF THE DRAWINGS

Other objects, features and advantages of the present invention will become more apparent from the following detailed description when read in conjunction with the accompanying drawings in which.

DETAILED DESCRIPTION OF THE PREFERRED EMBODIMENTS

Before explaining the preferred embodiments of the present invention, a description will now be given of a conceivable audio coding and quantization method of International Standard ISO/IEC 13818-7, with reference to the accompanying drawings, in order to facilitate understanding of the principles of the present invention.

The Moving Picture Expert Group within the International Organization of Standardization has provided an advanced audio coding algorithm (MPEG-2 AAC) for multichannel coding. The MPEG-2 standard will improve stereophonic images and will be of importance both for audio-only and multimedia applications. In addition, Dolby's AC-3 system is a second example of multichannel coding, which makes use of perceptual phenomena, occurring if the human ear detects multiple signals, by combining a number of individual transform coefficients into a common coefficient.

Figure 7:
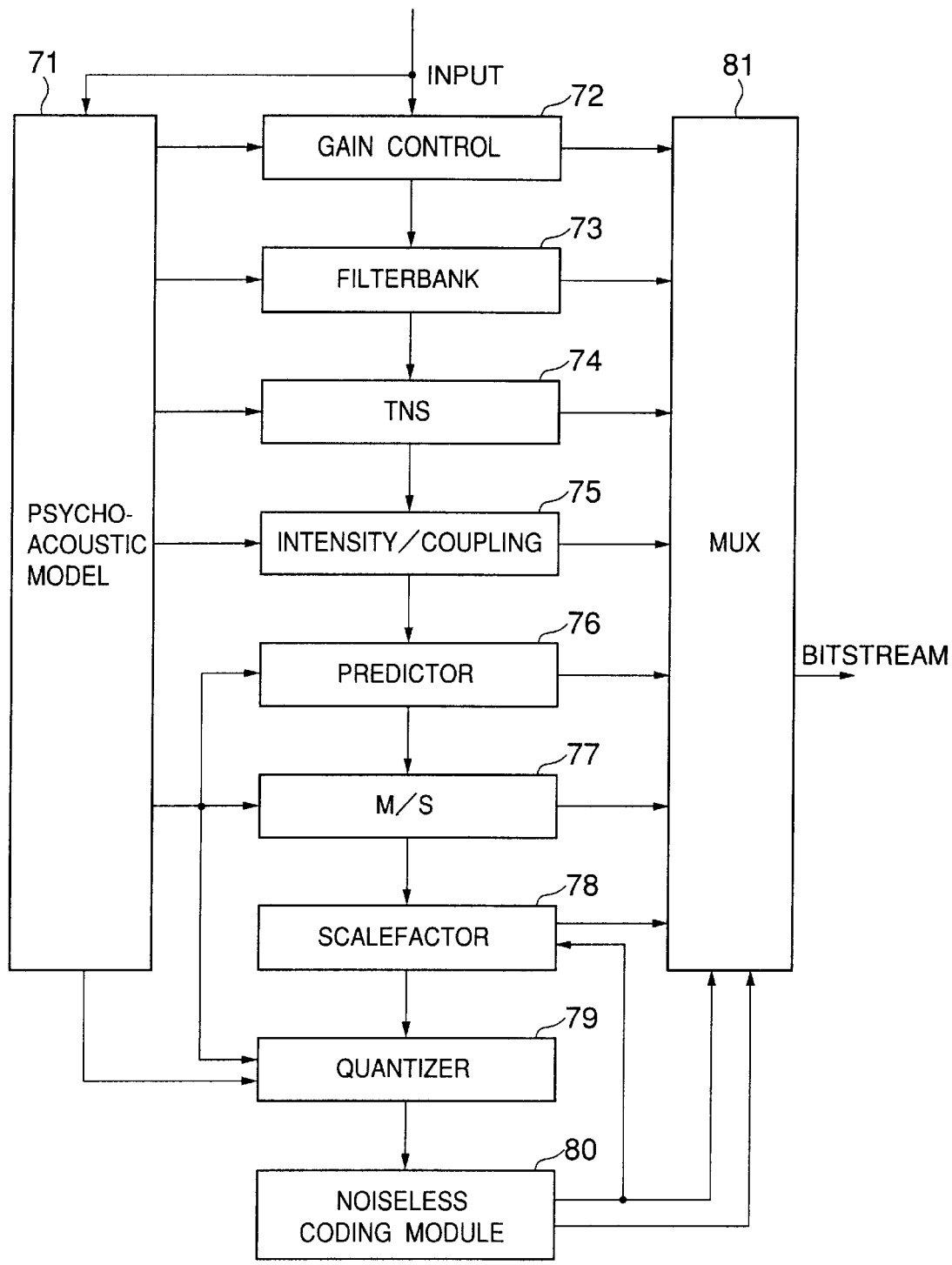
FIG. 7 is a block diagram of a basic structure of an AAC encoder.

FIG. 7 is a block diagram of a basic structure of an AAC encoder.

As shown in FIG. 7, the AAC encoder includes a psychoacoustic model 71, a gain control 72, a filterbank 73, a temporal noise shaping (TNS) 74, an intensity/coupling 75, a predictor 76, a middle-side stereo (M/S) module 77, a scalefactor module 78, a quantizer 79, and a noiseless coding module 80. An audio signal, input to the AAC encoder, is a sequence of blocks of samples which are produced along the time axis. Each block of the audio signal is converted into a number of spectral subband components via the filterbank 73. The psychoacoustic model 71 calculates an allowed distortion level for each subband component of the audio signal. In the AAC encoder, the basic mapping of the audio input into a number of subbands, fixed segmentation to format the data into blocks (or frames), and quantization with block compounding are provided.

By using the elements 72 through 77 of the AAC encoder, each block of the audio signal is subjected to the frequency mapping by using the modified discrete cosine transform (MDCT). Further, stereophonic correlation coding and predictive coding processes are performed by these elements. The quantizer 79 carries out the quantization of MDCT coefficients based on the processed signal. Before doing the quantization, scalefactors used in the quantization are calculated, and the scalefactor module 78 stores the scalefactors.

The scalefactors include individual scalefactors of the spectral subbands which are different from each other, and a common scalefactor which is identical for all the spectral subbands. Suppose that "c" denotes the audio signal before the quantization and "q" denotes the audio signal after the quantization. The audio signal "q" is represented by the following formula:

$$q = [c/\{2^{0.25(Csf - sf[sfb])}\}]^{0.75} + 0.4054 \qquad (1)$$

where "sfb" denotes one of the subbands, "Csf" indicates a common scalefactor for all the subbands, and "sf[sfb]" indicates a scalefactor for one of the subbands.

As being apparent from the above formula (1), the larger the common scalefactor Csf is, the lower the level of accuracy of the quantization becomes. In addition, it can be readily understood that the smaller the scalefactor sf[sfb] for each subband sfb is, the lower the level of accuracy of the quantization is.

In the AAC encoder of FIG. 7, the input to the noiseless coding module 80 is the set of 1024 quantized spectral coefficients. The noiseless coding is done inside a quantizer rate control loop, and it is part of an iterative process that converges when the total bit count is within some interval surrounding the allocated bit count. In the noiseless coding module 80, the noiseless coding is performed through a spectrum clipping step, a preliminary Huffman coding step and a section merging step. The preliminary Huffman coding uses the maximum number of sections. The section merging step achieves the lowest bit count.

To achieve the determination of the scalefactors and the noiseless coding with a desired resolution, it is necessary to efficiently achieve a convergence of the iterative process such that the total bit count is within some interval surrounding the allocated bit count. To reach the convergence, it must be determined that both the bit rate requirement for the number of bits available to encode a bitstream, obtained based on a given encoding bit rate, and the masking requirement for the allowed distortion level of each scalefactor band, supplied by the psychoacoustic model 71, are satisfied. The bit rate requirement is met when the number of needed bits to encode the bitstream is not larger than the number of available bits. The masking requirement is met when the quantization error level of the frequency domain values (the MDCT coefficients) with the scalefactors applied to the values within the scalefactor bands is less than the allowed distortion level.

Generally, when the level of accuracy of the quantization becomes low, the quantization error level is raised but the total bit count of each frame is lowered. In determining the bit allocation, the bit rate requirement and the masking requirement contradict each other. To attain the desired resolution, the determination of the scalefactors and the noiseless coding are repeated while changing the common scalefactor Csf and the individual scalefactors sf[sfb], until the two requirements are met at the same time.

After the convergence is reached such that the two requirements are met, the quantization and the Huffman coding are finally carried out. In the multiplexer 81, the encoded bitstream is output in addition to other header information.

Figure 8:
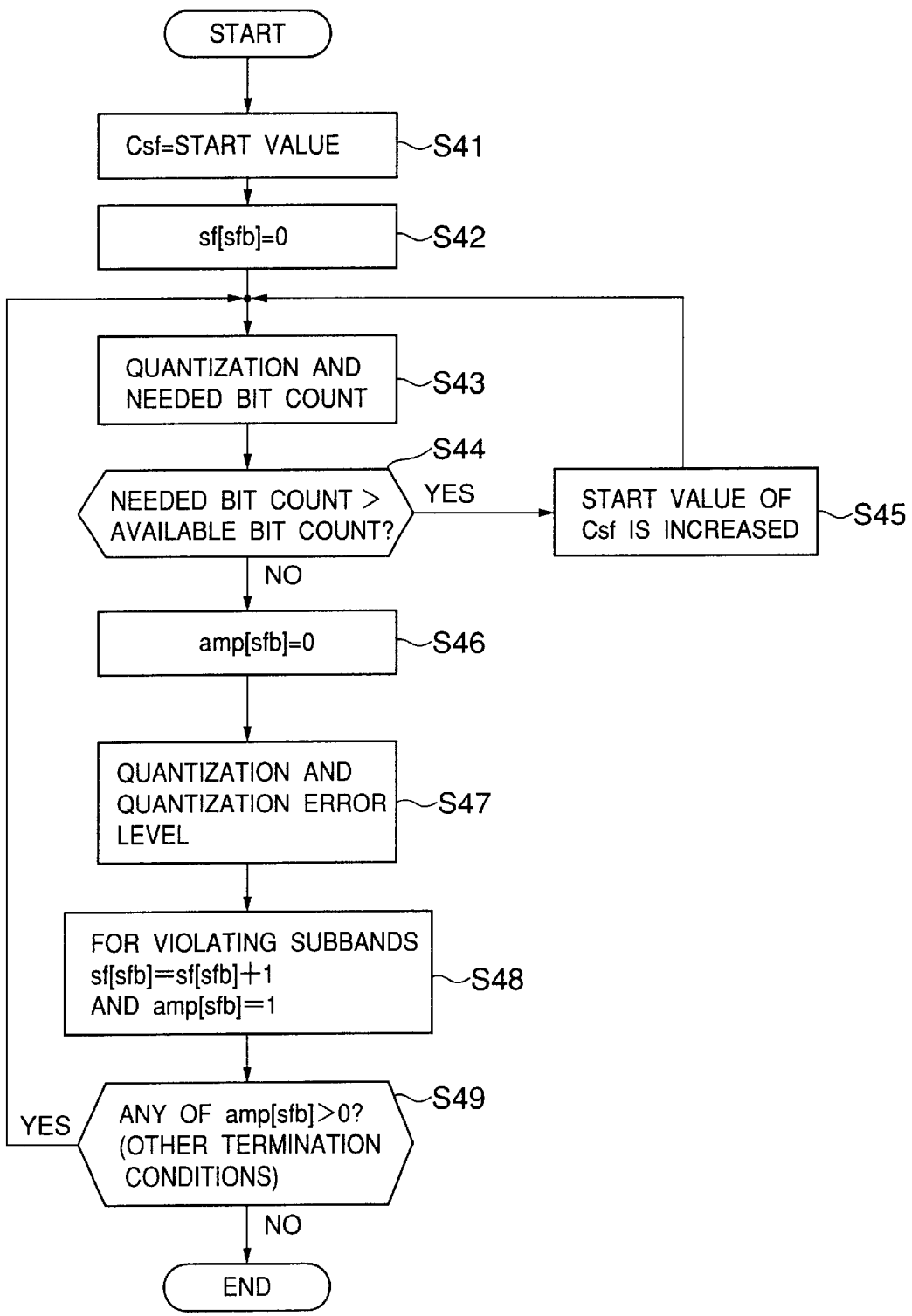
FIG. 8 is a flowchart for explaining a conceivable audio coding and quantization method.

FIG. 8 is a flowchart for explaining a conceivable audio coding and quantization method based on International Standard ISO/IEC 13818-7.

As shown in FIG. 8, at a start of the conceivable audio coding and quantization method, step S41 sets the common scalefactor Csf to a start value (Csf=start value). An appropriate start value is previously calculated so that all quantized MDCT coefficients can be encoded in the bitstream. Step S42 sets the individual scalefactors sf[sfb] for all the scalefactor bands sfb to zero (sf[sfb]=0). Step S43 calculates the quantization of the MDCT coefficients for the audio signal, and calculates the count of bits needed to encode the bitstream. The count of available bits for encoding the bitstream is predetermined based on a given encoding bit rate at the start of this process. Step S44 determines whether the count of needed bits is larger than the count of available bits.

When the result at the step S44 is affirmative, the count of needed bits is larger than the count of available bits, and it is determined necessary to further control the bit allocation. Step S45 increases the start value of the common scalefactor Csf by a given change. After the step S45 is performed, the above steps S43 and S44 are repeated until the count of needed bits, produced by the quantization of the MDCT coefficients with the new common scalefactor Csf applied, is less than the count of available bits. The loop process, including the steps S43 through S45, relates to the check of the bit rate requirement, and it is called an inner control loop.

When the result at the step S44 is negative, the count of needed bits is less than the count of available bits. Step S46 sets information bits amp[sfb] for all the scalefactor bands sfb to zero (amp[sfb]=0). Each of the information bits amp[sfb] is provided to indicate whether the scalefactor sf[sfb] of the related scalefactor band is currently changed. Namely, when amp[sfb]=0, it indicates that the scalefactor sf[sfb] of the related scalefactor band remains unchanged after a subsequent calculation of the quantization, and when amp[sfb]=1, it indicates that the scalefactor sf[sfb] of the related scalefactor band is changed after a subsequent calculation of the quantization.

Step S47 calculates the quantization of the MDCT coefficients with the common scalefactor Csf and the individual scalefactors sf[sfb], at this instant, applied to the frequency domain values, and calculates the quantization error level of each of the scalefactor bands sfb based on the quantized frequency domain values. After the step S47 is performed, step S48 checks if the quantization error level is larger than the allowed distortion level for each of the scalefactor bands. Step S48 increments the scalefactors sf[sfb] (sf[sfb]=sf[sfb]+1) for the scalefactor bands sfb having a distortion that exceed the allowed distortion levels of the related bands, and sets the information bits amp[sfb] to one (amp[sfb]=1) for such scalefactor bands sfb where the scalefactors are changed.

After the step S48 is performed, step S49 determines whether at least one scalefactor band has the information bit amp[sfb] that is larger than zero (any of amp[sfb]>0). If there is at least one scalefactor band where the information bit amp[sfb] is equal to 1, the bit rate requirement that the count of needed bits is less than the count of available bits might be violated as a result of the calculation of the quantization at the step S47.

When the result at the step S49 is affirmative, it is determined that the bit rate requirement is not met, and the above steps S43 through S49 are repeated until all the information bits amp[sfb] are equal to 0. The inner control loop, including the initial calculation of the quantization, is again carried out so as to check the bit rate requirement, and the subsequent calculation of the quantization is again carried out so as to check the masking requirement. The loop process, including the steps S43 through S49, relates to the check of both the bit rate requirement and the masking requirement, and it is called an outer control loop.

When the result at the step S49 is negative, it is determined that both the bit rate requirement and the masking requirement are met. The control of the bit allocation is normally terminated if there is no scalefactor band with higher than the allowed distortion level. However, this is not always possible to obtain.

In such a case, the above step S49 includes, in addition to the check of the masking requirement, termination conditions for termination of the outer control loop. In the above step S49, if the scalefactors for all the scalefactor bands are already changed, the outer control loop is terminated. Further, if the difference between two consecutive scalefactors is larger than a given upper limit, the outer control loop is terminated. There might be an additional condition which terminates the outer control loop in case of a lack of the computing time.

In the above-described method of International Standard ISO/IEC 13818-7, the steps S43 through S45 relate to the check of the bit rate requirement that the count of needed bits is less than the count of available bits. The steps S47 through S49 relate to the masking requirement that the quantization error level is less than the allowed distortion level. After the control of the bit allocation is done, the finally determined common scalefactor Csf and the finally determined scalefactors sf[sfb] are stored, and an output vector of quantized frequency domain values is finally produced based on the stored scaling factors.

In the above-described method of International Standard ISO/IEC 13818-7, there is some problem in the control of the bit allocation and the quantization. A description will now be given of the problem of the method of International Standard ISO/IEC 13818-7 with reference to FIG. 9 through FIG. 14.

Figure 9:
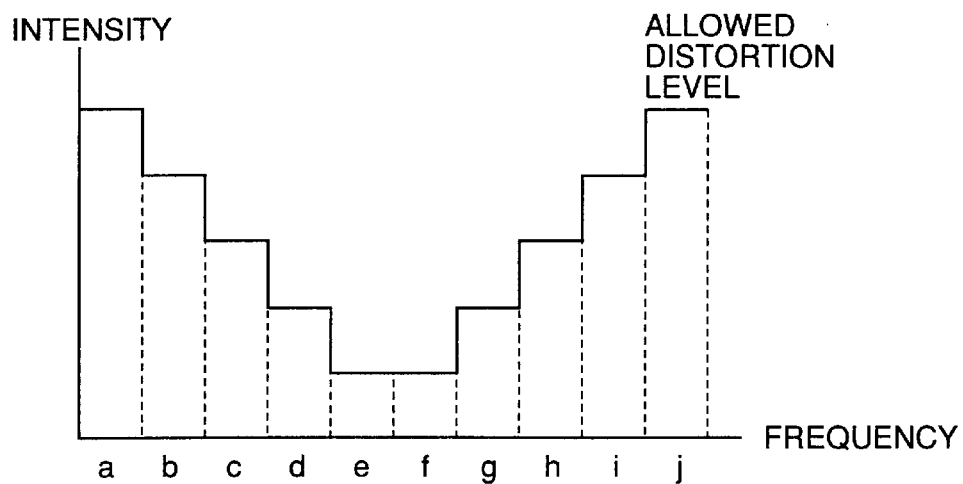
FIG. 9 is a diagram for explaining a spectral distribution of the allowed distortion over subbands of an audio signal.

FIG. 9 shows a spectral distribution of the allowed distortion over subbands of an audio signal. In FIG. 9, "a" through "j" denote the spectral subbands of the audio signal, which correspond to the scalefactor bands of the audio signal. Suppose that the allowed distortion levels are distributed over the subbands "a" through "j" in a staircase formation as shown in FIG. 9.

Figure 10:
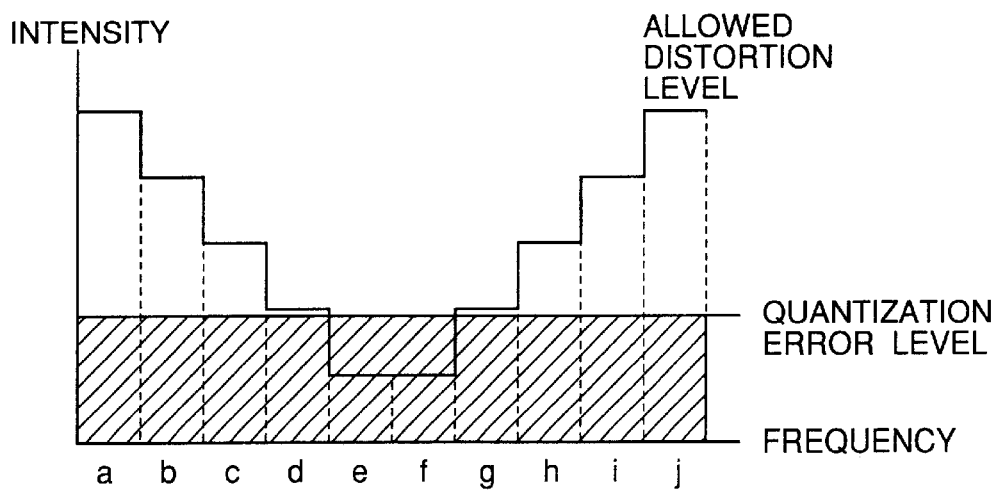
FIG. 10 is a diagram for explaining a relationship between the allowed distortion and the quantization error when the quantization is done with a start value of a common scalefactor.

FIG. 10 shows a relationship between the allowed distortion and the quantization error when the quantization is done with the start value of the common scalefactor. In the first run of the step S43 of FIG. 8, the quantization of the MDCT coefficients with the common scalefactor having the initial start value and the individual scalefactors having the initial values is calculated. At this instant, the quantization errors of all the scalefactor bands "a" through "j" are at a constant level as shown in FIG. 10.

Figure 11:
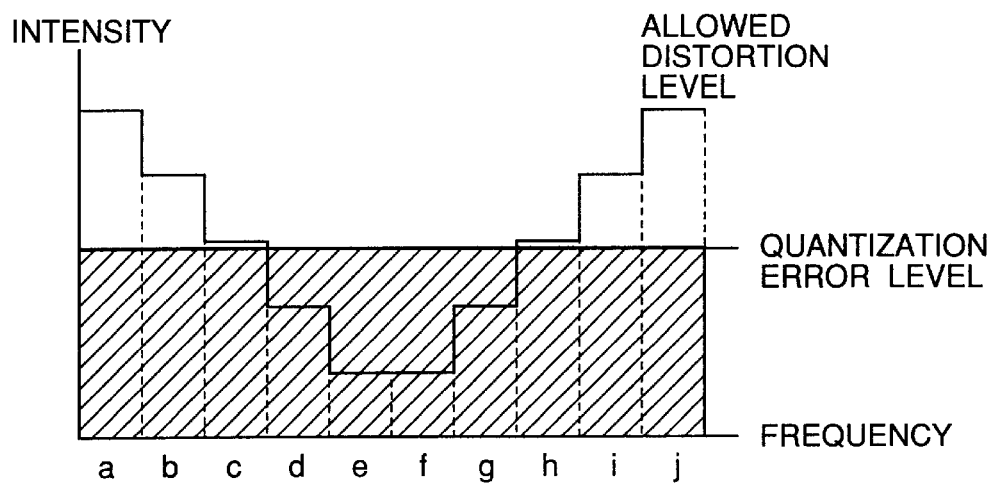
FIG. 11 is a diagram for explaining a relationship between the allowed distortion and the quantization error when the quantization is done with an increased start value of the common scalefactor.

FIG. 11 shows a relationship between the allowed distortion and the quantization error when the quantization is done with the increased start value of the common scalefactor. In a subsequent run of the step S43, the quantization of the MDCT coefficients with the common scalefactor having the increased start value is calculated. As shown in FIG. 11, the quantization errors of all the scalefactor bands "a" through "j" are equally raised from the initial level of FIG. 10. Suppose that, at this instant, the bit rate requirement that the count of needed bits is less than the count of available bits is met, and the steps S46, S47 and S48 are performed. In the step S48, the masking requirement that the quantization error level is less than the allowed distortion level for each of the scalefactor bands "a" through "f" is checked. As shown in FIG. 11, in the present example, the scalefactor bands "d" through "g" are the violating subbands. For the violating subbands, the scalefactors are incremented (sf[sfb]=sf[sfb]+1) and the information bits are set to 1 (amp[sfb]=1) in the step S48.

Figure 12:
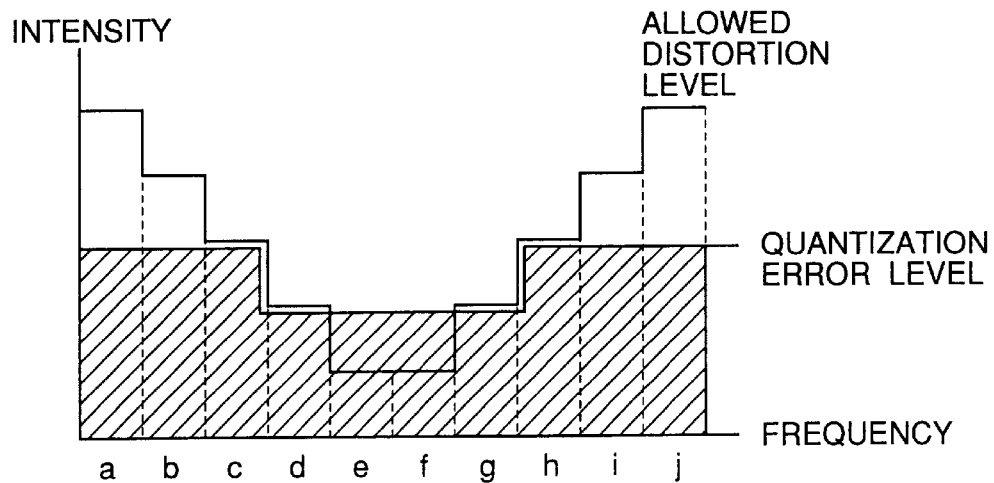
FIG. 12 is a diagram for explaining a relationship between the allowed distortion and the quantization error when the quantization is done for the violating subbands.

FIG. 12 shows a relationship between the allowed distortion and the quantization error when the quantization is done for the violating subbands.

As shown in FIG. 12, as a result of the calculation of the quantization with the changed scalefactors, the quantization error levels for the violating subbands "d" through "g" are lowered. As the scalefactors of the violating subbands are changed, the steps S43 through S49 are repeated.

Figure 13:
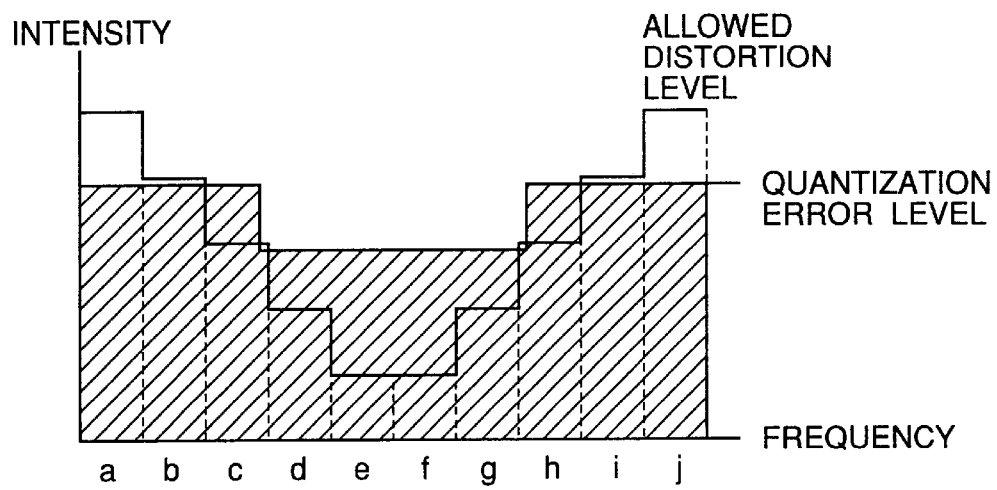
FIG. 13 is a diagram for explaining a relationship between the allowed distortion and the quantization error when a further quantization is done with a further increased start value of the common scalefactor.

FIG. 13 shows a relationship between the allowed distortion and the quantization error when a further quantization is done with a further increased start value of the common scalefactor.

Similar to the case of FIG. 11, the quantization errors of all the scalefactor bands "a" through "j" are equally raised from the level of FIG. 12. Suppose that, at this instant, the bit rate requirement is met, and the steps S46, S47 and S48 are again performed. In the step S48, the masking requirement for each of the scalefactor bands "a" through "f" is checked. As shown in FIG. 13, in the present example, the scalefactor bands "c" through "h" are the violating subbands related to the masking requirement. For the violating subbands "c" through "h", the scalefactors are incremented (sf[sfb]=sf[sfb]+1) and the information bits are set to 1 (amp[sfb]=1) in the step S48.

Figure 14:
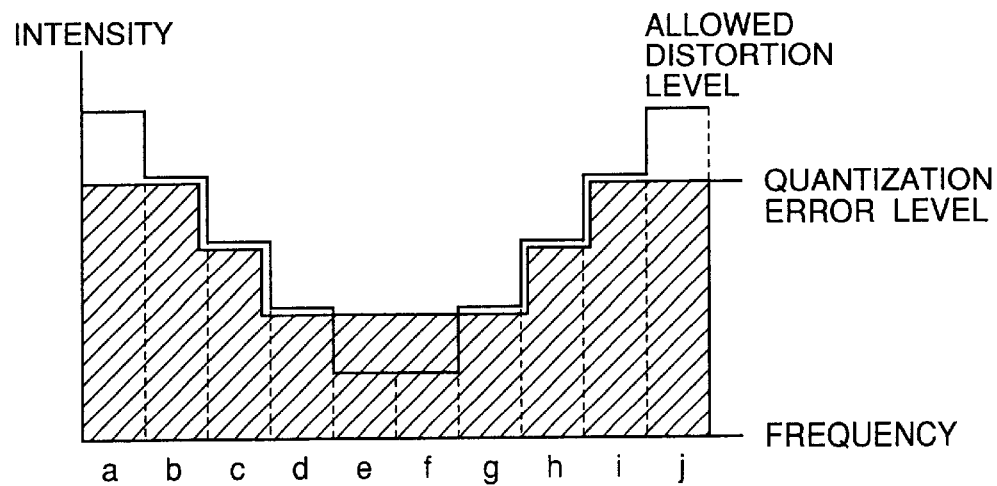
FIG. 14 is a diagram for explaining a relationship between the allowed distortion and the quantization error when a further quantization is done for the violating subbands.

FIG. 14 shows a relationship between the allowed distortion and the quantization error when a further quantization is done for the violating subbands.

Similar to the case of FIG. 12, as a result of the calculation of the quantization with the changed scalefactors, the quantization error levels for the violating subbands "c" through "h" are lowered as shown in FIG. 14. However, the scalefactor bands "e" and "f" at the present instant still do not satisfy the masking requirement. A further calculation of the quantization with the changed scalefactors may be required in order to meet both the bit rate requirement and the masking requirement. That is, the scalefactors of the violating subbands "e" and "f" are changed, the steps S43 through S49 are again repeated. Alternatively, there may be a case in which the masking requirement cannot be finally met. In such a case, the degradation of coding quality may occur due to nonconvergence.

In the example of FIG. 14, the allowed distortion levels of the subbands "e" and "f" are the smallest intensity, and if there exists a large distortion for such subbands, the resulting noise of the decoded signal will be very perceptible to the human ear. It is desirable to allocate the necessary bits for encoding the bitstream to such subbands in preference to other subbands.

In the above-described method of International Standard ISO/IEC 13818-7, it is difficult to speedily carry out the iterative process that converges when the total bit count is within some interval surrounding the allocated bit count, while preventing the degradation of coding quality due to nonconvergence. If both the bit rate requirement and the masking requirement are not finally met, it is likely to cause the degradation of coding quality.

Further, in the above method of International Standard ISO/IEC 13818-7, when the check of the masking requirement is done in the step S48, the quantization error levels of all the scalefactor bands are not always less than the allowed distortion levels. Even if both the bit rate requirement and the masking requirement are finally met, it requires a relatively large computing time until the convergence is reached. As long as the masking requirement is not met (or the result at the step S49 is affirmative), the outer control loop with the steps S43 through S49 must be repeated too many times. The repeated bit allocation control includes some redundant processes.

Next, a description will be given of the preferred embodiments of the present invention with reference to the accompanying drawings.

In order to eliminate the above-mentioned problem of the method of International Standard ISO/IEC 13818-7, an audio coding and quantization method of the present invention is characterized in that the calculation of a quantization of frequency domain values of a related block of an audio signal and the calculation of a quantization noise for each subband are alternately performed when controlling the bit allocation for the related block, such that both the bit rate requirement and the masking requirement are met, and, after both the requirements are met, an output vector of quantized frequency domain values is finally produced.

Figure 1:
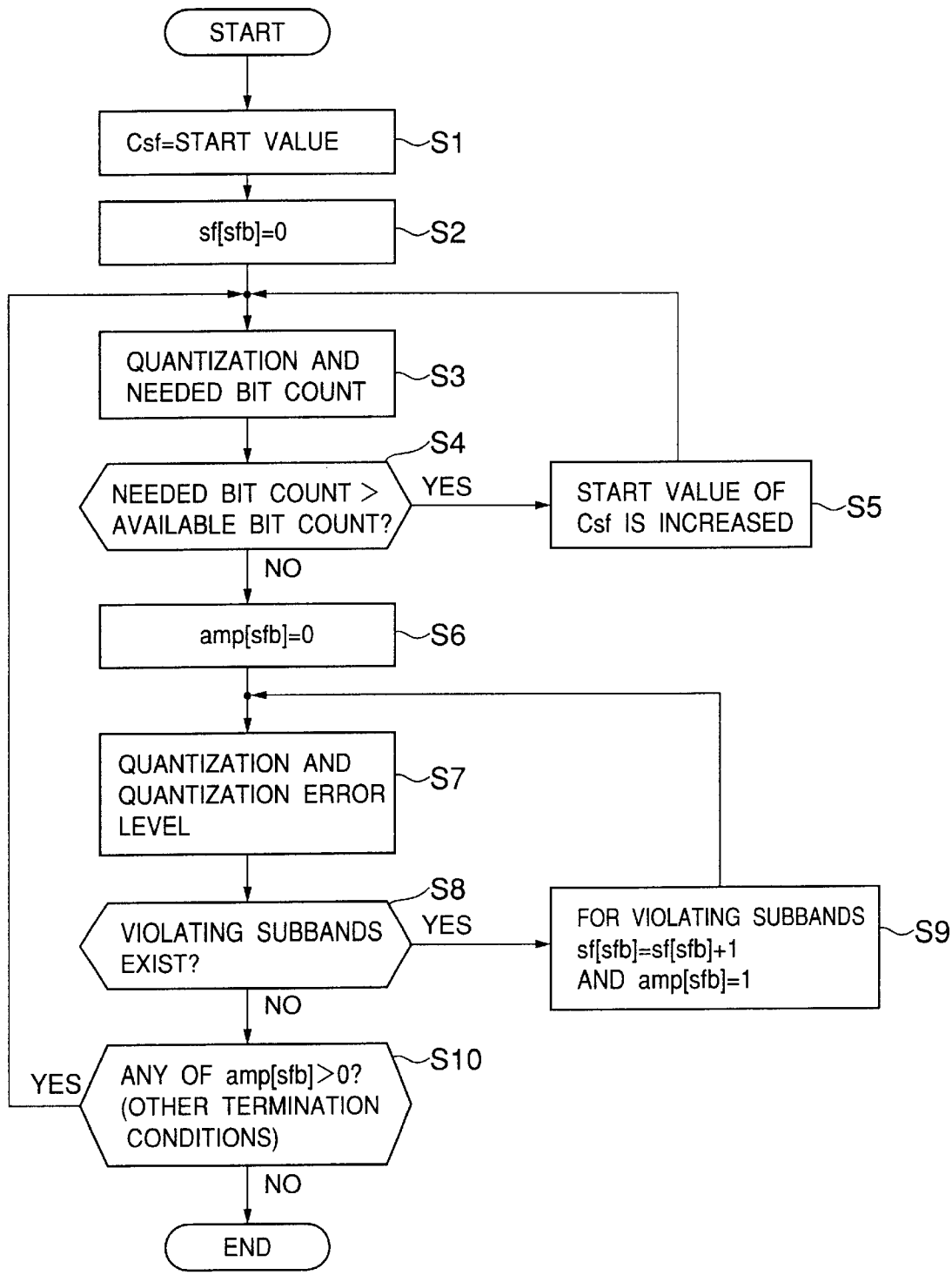
FIG. 1 is a flowchart for explaining an audio coding and quantization method embodying the present invention.

FIG. 1 shows an audio coding and quantization method embodying the present invention.

As shown in FIG. 1, at a start of the audio coding and quantization method, step S1 sets the common scalefactor Csf to a start value (Csf=start value). An appropriate start value is previously calculated so that all quantized MDCT coefficients can be encoded in the bitstream. Step S2 sets the individual scalefactors sf[sfb] for all the scalefactor bands sfb to zero (sf[sfb]=0). Step S3 calculates the quantization of the MDCT coefficients for the audio signal, and calculates the count of bits needed to encode the bitstream. The count of available bits for encoding the bitstream is predetermined based on a given encoding bit rate at the start of this process. Step S4 determines whether the count of needed bits is larger than the count of available bits.

When the result at the step S4 is affirmative, the count of needed bits is larger than the count of available bits, and it is determined necessary to further control the bit allocation. Step S5 increases the start value of the common scalefactor Csf by a given change. After the step S5 is performed, the above steps S3 and S4 are repeated until the count of needed bits, produced by the quantization of the MDCT coefficients with the new common scalefactor Csf applied, is less than the count of available bits. The loop process including the steps S3 through S5 relates to the check of the bit rate requirement, and hereinafter it is called a first control loop.

When the result at the step S4 is negative, the count of needed bits is less than the count of available bits. Step S6 sets information bits amp[sfb] for all the scalefactor bands sfb to zero (amp[sfb]=0). Each of the information bits amp[sfb] is provided to indicate whether the scalefactor sf[sfb] of the related scalefactor band is currently changed. Namely, when amp[sfb]=0, it indicates that the scalefactor sf[sfb] of the related scalefactor band remains unchanged after a subsequent calculation of the quantization, and when amp[sfb]=1, it indicates that the scalefactor sf[sfb] of the related scalefactor band is changed after a subsequent calculation of the quantization.

Step S7 calculates the quantization of the MDCT coefficients with the common scalefactor Csf and the individual scalefactors sf[sfb], at this instant, applied to the frequency domain values, and calculates the quantization error level of each of the scalefactor bands sfb based on the quantized frequency domain values.

After the step S7 is performed, step S8 determines whether there are violating scalefactor bands sfb having a distortion that exceeds the allowed distortion levels of the related bands. In the violating scalefactor bands, the quantization error level is larger than the allowed distortion level.

When the result at the step S8 is affirmative, step S9 increments the scalefactors sf[sfb] (sf[sfb]=sf[sfb]+1) for the violating scalefactor bands having a distortion that exceed the allowed distortion levels of the related bands, and sets the information bits amp[sfb] to one (amp[sfb]=1) for such scalefactor bands where the scalefactors are changed. After the step S9 is performed, the above steps S7 and S8 are repeated until the check of the masking requirement is completed. The loop process including the steps S7 through S9 relates to the check of the masking requirement, and hereinafter it is called a second control loop. Hence, in the method of the present embodiment, after the scalefactors for the violating subbands are changed, only the check of the masking requirement (the second control loop) is repeated without performing the check of the bit rate requirement, and it is possible to speedily carry out the check of the masking requirement for all the scalefactor bands.

When the result at the step S8 is negative, there is no scalefactor band having a distortion that exceeds the allowed distortion levels of the related bands. Step S10 determines whether at least one scalefactor band has the information bit amp[sfb] that is larger than zero (any of amp[sfb]>0). If there is at least one scalefactor band where the information bit amp[sfb] is equal to 1, the bit rate requirement that the count of needed bits is less than the count of available bits might be violated as a result of the calculation of the quantization at the step S7.

When the result at the step S10 is affirmative, it is determined that the bit rate requirement is not met, and the above steps S3 through S10 are repeated until all the information bits amp[sfb] are equal to 0. Hence, in the method of the present embodiment, the first control loop, including the calculation of a quantization of the frequency domain values and the check of the bit rate requirement, and the second control loop, including the calculation of a quantization noise for each subband and the check of the masking requirement, are alternately performed when controlling the bit allocation for the related block, such that both the bit rate requirement and the masking requirement are met.

When the result at the step S10 is negative, it is determined that both the bit rate requirement and the masking requirement are met. The control of the bit allocation is normally terminated if there is no scalefactor band with higher than the allowed distortion level. However, this is not always possible to obtain. In such a case, the above step S10 includes, in addition to the check of the bit rate and masking requirements, termination conditions for termination of the audio coding quantization method. In the above step S10, if the scalefactors for all the scalefactor bands are already changed, the audio coding and quantization method is terminated. Further, if the difference between two consecutive scalefactors is larger than a given upper limit, the audio coding and quantization method is terminated. There might be an additional condition which terminates the audio coding and quantization method in case of a lack of the computing time.

In the above-described method of the present embodiment, the steps S3 through S5 relate to the check of the bit rate requirement that the count of needed bits is less than the count of available bits. The steps S7 through S9 relate to the check of the masking requirement that the quantization error level is less than the allowed distortion level. After the control of the bit allocation is done, the finally determined common scalefactor Csf and the finally determined scalefactors sf[sfb] are stored, and an output vector of quantized frequency domain values is finally produced based on the stored scaling factors.

Next, a description will be given of the operation of the audio coding and quantization method of the present embodiment with reference to FIG. 2 through FIG. 4 by comparison with the method of International Standard ISO/IEC 13818-7.

In the first run of the step S3 of the method of FIG. 1, the quantization of the MDCT coefficients with the common scalefactor having the initial start value and the individual scalefactors having the initial values is calculated. A relationship between the allowed distortion and the quantization error at this instant is similar to that of FIG. 10. That is, when the quantization is done with the start value of the common scalefactor, the quantization errors of all the scalefactor bands "a" through "j" are at a constant level as shown in FIG. 10.

In a subsequent run of the step S3, the quantization of the MDCT coefficients with the common scalefactor having the increased start value is calculated. A relationship between the allowed distortion and the quantization error when the quantization is done with the increased start value of the common scalefactor is similar to that of FIG. 11. As shown in FIG. 11, the quantization errors of all the scalefactor bands "a" through "j" are equally raised from the initial level of FIG. 10. Suppose that, at this instant, the bit rate requirement that the count of needed bits is less than the count of available bits is met, and the steps S6, S7 and S8 are performed. In the step S8, the masking requirement that the quantization error level is less than the allowed distortion level for each of the scalefactor bands "a" through "f" is checked. As shown in FIG. 11, in the present example, the scalefactor bands "d" through "g" are the violating subbands. For the violating subbands, the scalefactors are incremented (sf[sfb]=sf[sfb]+1) and the information bits are set to 1 (amp[sfb]=1) in the step S9.

In the method of International Standard ISO/IEC 13818-7, as a result of the calculation of the quantization with the changed scalefactors, the quantization error levels for the violating subbands "d" through "g" are equally lowered by only one as shown in FIG. 12.

In the method of FIG. 1, immediately after the step S9 is performed, the quantization of the MDCT coefficients with the common scalefactor having the increased start value and the increased scalefactors of the violating scalefactor bands is calculated in the step S7. In the example of FIG. 12, the scalefactor bands "e" and "f" are still the violating subbands. In a subsequent run of the step S8, it is determined that the violating subbands having a distortion that exceeds the allowed distortion level still exist. Hence, the incrementing of the scalefactors for the violating subbands in the step S9 is again executed (twice in total). Therefore, a relationship between the allowed distortion and the quantization error when the quantization is done for the violating subbands is similar to that of FIG. 2.

Figure 2:
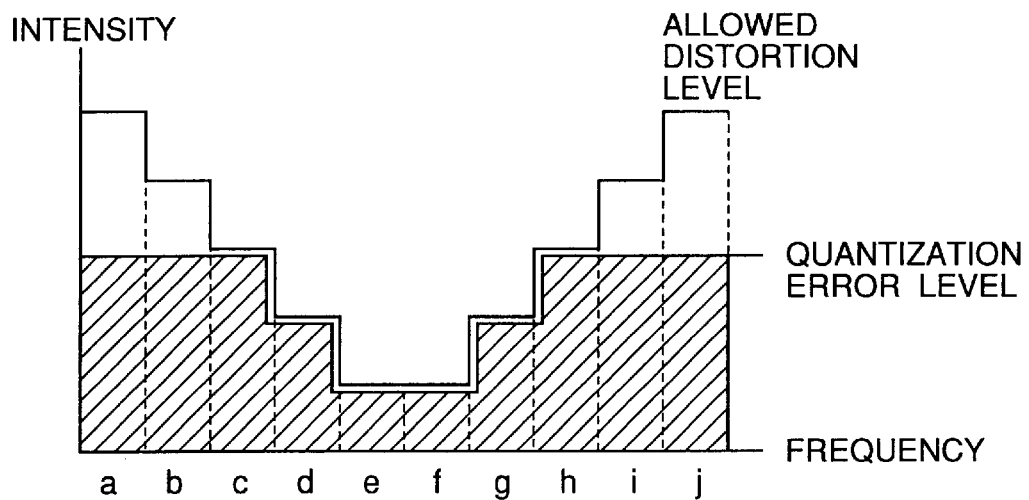
FIG. 2 is a diagram for explaining a relationship between the allowed distortion and the quantization error when the quantization is done for the violating subbands.

FIG. 2 shows a relationship between the allowed distortion and the quantization error when the quantization is done for the violating subbands in the present embodiment. As shown in FIG. 2, there is no subband having a distortion that exceeds the allowed distortion level. In this case, the result at the step S8 is negative, and the step S10 is then performed. As the scalefactors for the violating subbands are changed in the step S9, the result at the step S10 at this instant is affirmative. The steps S3 through S10 are repeated.

Figure 3:
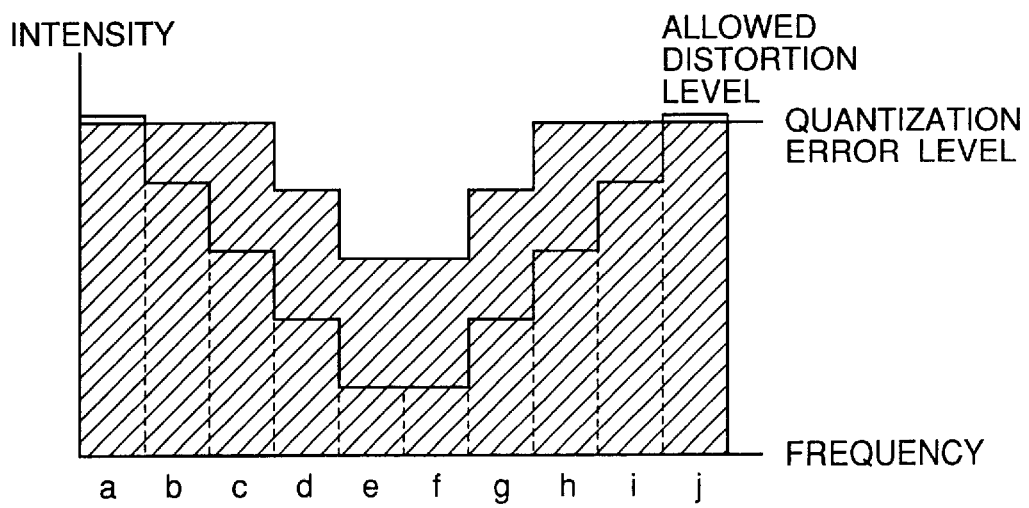
FIG. 3 is a diagram for explaining a relationship between the allowed distortion and the quantization error when a further quantization is done with a further increased start value of the common scalefactor and increased scalefactors.
Figure 4:
FIG. 4 is a diagram for explaining a relationship between the allowed distortion and the quantization error when a further quantization is done for the violating subbands.

In a subsequent run of the first control loop (the steps S3 through S5), if the common scalefactor is increased, a relationship between the allowed distortion and the quantization error, similar to that of FIG. 3, is obtained. As shown in FIG. 3, the quantization errors of all the scalefactor bands "a" through "j" are equally raised from the level of FIG. 2. The scalefactors for the violating subbands "e" and "f" are incremented twice in the example of FIG. 2, and therefore the count of needed bits in the case of FIG. 3 is larger than that in the case of FIG. 12.

In the example of FIG. 3, the scalefactor bands "b" through "i" are the violating subbands. In a subsequent run of the second control loop (the steps S7 through S9), the scalefactors for the violating subbands are incremented and the information bits are set to 1 in the step S9. According to the method of the present embodiment, the second control loop is executed in a repetitive manner. In the example of FIG. 3, the execution of the step S9 is repeated three times. Then, a relationship between the allowed distortion and the quantization error, similar to that of FIG. 4, is obtained. As shown in FIG. 4, the quantization error levels of all the scalefactor bands "a" through "j" are less than the allowed distortion levels. After both the bit rate requirement and the masking requirement are met, an output vector of quantized frequency domain values is finally produced.

Accordingly, in the method of the present embodiment, a total number of executions of the bit allocation control is remarkably reduced, and it is possible to speedily reach the convergence. The audio coding quantization method of the present embodiment is effective in providing high coding quality without providing high signal-to-noise ratios. It is possible to speedily carry out the iterative process that converges when the total bit count is within some interval surrounding the allocated bit count, while preventing the degradation of coding quality due to nonconvergence.

Further, in the method of the present embodiment, when the check of the masking requirement is done in the step S8, the quantization error levels of all the scalefactor bands are always less than the allowed distortion levels. When the bit rate requirement and the masking requirement are finally met, it requires only a small computing time until the convergence is reached. The total number of executions of the bit allocation control is remarkably reduced, and it is possible to speedily reach the convergence. Hence, the audio coding and quantization method of the present embodiment can speedily carry out the iterative process that converges when the total bit count is within some interval surrounding the allocated bit count, while preventing the degradation of coding quality due to nonconvergence.

In the above-described embodiment, when controlling the bit allocation for the related block of the audio signal, the calculation of a quantization of frequency domain values of the related block is first performed, and the calculation of a quantization noise for each subband is subsequently performed. However, the present invention is not limited to this embodiment. It is adequate that the calculation of a quantization of frequency domain values of the related block and the calculation of a quantization noise for each subband are alternately performed regardless of the sequence of the calculations.

Figure 5:
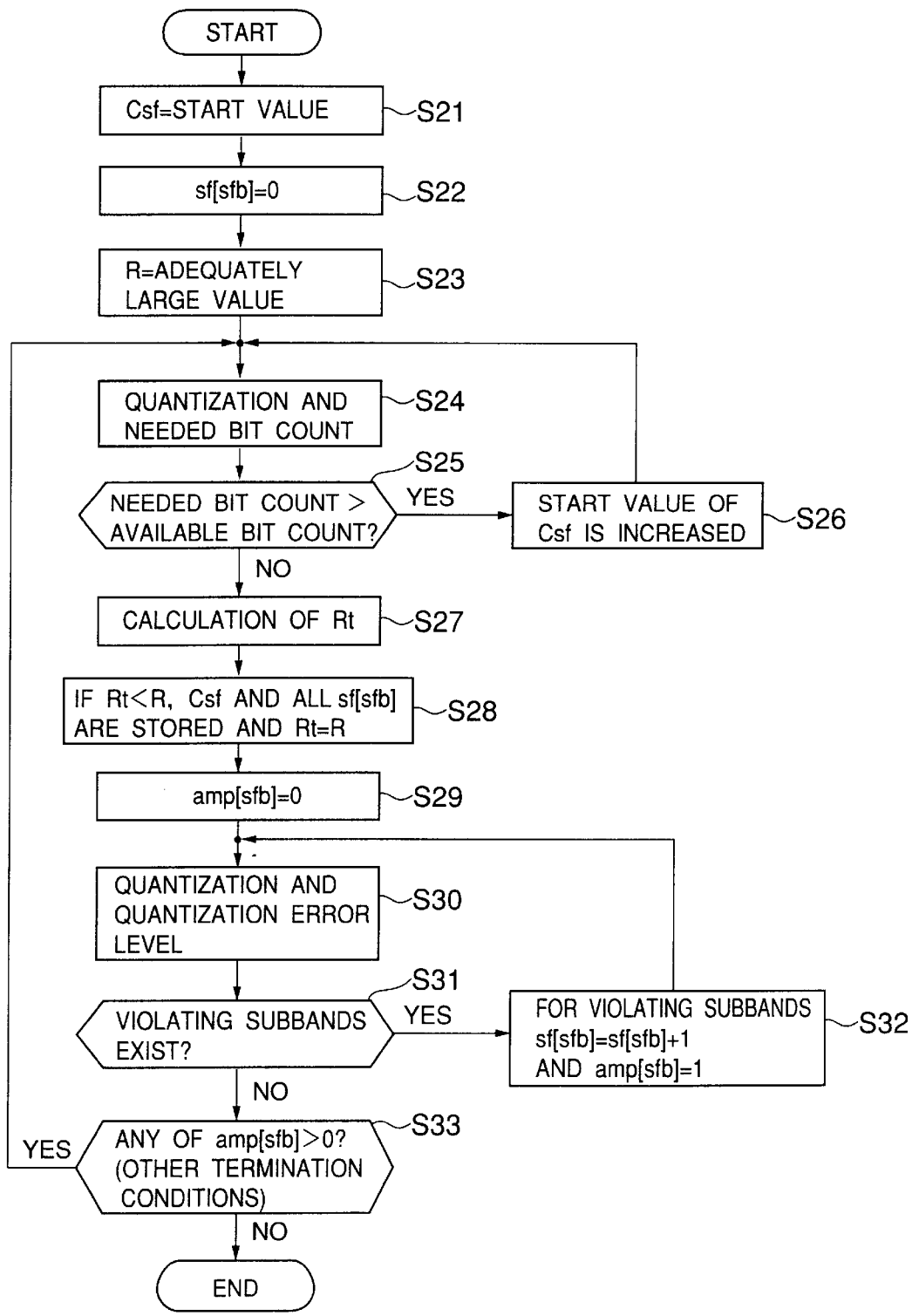
FIG. 5 is a flowchart for explaining another embodiment of the audio coding and quantization method of the present invention.
Figure 6:
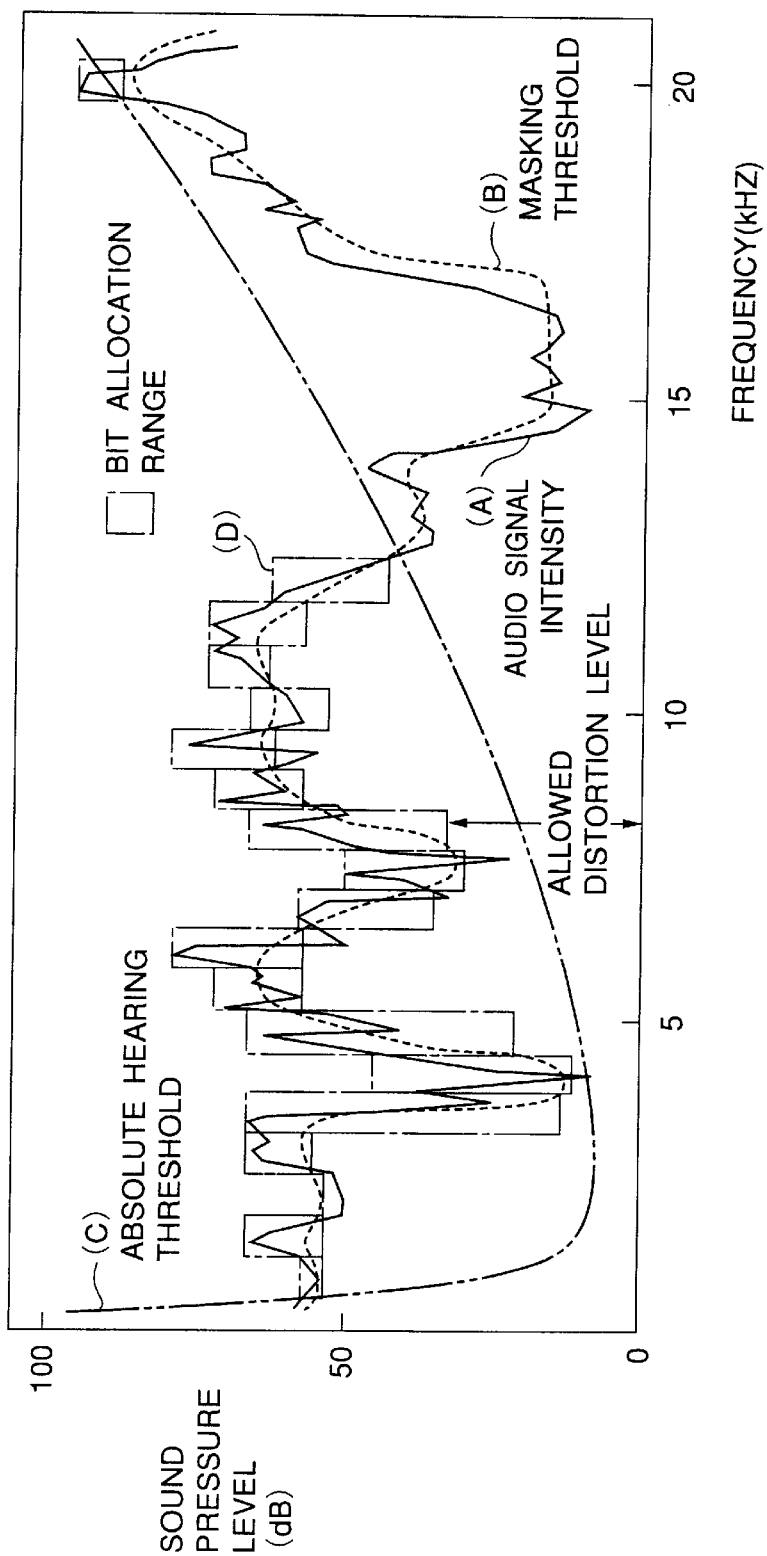
FIG. 6 is a diagram for explaining a relationship between the absolute hearing threshold and the masking threshold in a spectral distribution of an audio signal.

FIG. 5 shows another embodiment of the audio coding and quantization method of the present invention.

As shown in FIG. 5, at a start of the present embodiment of the audio coding and quantization method, step S21 sets the common scalefactor Csf to a start value (Csf=start value). An appropriate start value is previously calculated so that all quantized MDCT coefficients can be encoded in the bitstream. Step S22 sets the individual scalefactors sf[sfb] for all the scalefactor bands sfb to zero (sf[sfb]=0). Step S23 sets a reference constant R to an adequately large value. The reference constant R is provided to check a parameter Rt of the audio signal (which will be described later) by comparison with the reference constant R. In the present embodiment, the reference constant R is set to an adequately large value in the step S23, and it is initially larger than an upper limit of the parameter Rt.

Step S24 calculates the quantization of the MDCT coefficients for the audio signal, and calculates the count of bits needed to encode the bitstream. The count of available bits for encoding the bitstream is predetermined based on a given encoding bit rate at the start of this process. Step S25 determines whether the count of needed bits is larger than the count of available bits.

When the result at the step S25 is affirmative, the count of needed bits is larger than the count of available bits, and it is determined necessary to further control the bit allocation. Step S26 increases the start value of the common scalefactor Csf by a given change. After the step S26 is performed, the above steps S24 and S25 are repeated until the count of needed bits, produced by the quantization of the MDCT coefficients with the new common scalefactor Csf applied, is less than the count of available bits. The loop process including the steps S24 through S26 relates to the check of the bit rate requirement, and it is called the first control loop.

When the result at the step S25 is negative, the count of needed bits is less than the count of available bits. Step S27 calculates a parameter Rt of the audio signal. In the present embodiment, the parameter Rt is represented by a sum of the individual quantization error levels divided by the allowed distortion level of each scalefactor band, for all the scalefactor bands sfb. Step S28 compares the parameter Rt with the reference constant R. In the step S28, if Rt<R, the common scalefactor Csf and the individual scalefactors sf[sfb] are determined as being the optimum scaling factors that meet the bit rate requirement. If Rt<R, the step S28 stores the common scalefactor Csf and the individual scalefactors sf[sfb] at the instant into optimum scalefactor memory areas of a memory of the AAC encoder, and sets the reference constant R to the value of the calculated parameter Rt. In the first run of the step S28, the parameter Rt is always smaller than the reference constant R as the reference constant R was initially set to the adequately large value.

After the step S28 is performed, step S29 sets information bits amp[sfb] for all the scalefactor bands sfb to zero (amp[sfb]=0). Each of the information bits amp[sfb] is provided to indicate whether the scalefactor sf[sfb] of the related scalefactor band is currently changed. Namely, when amp[sfb]=0, it indicates that the scalefactor sf[sfb] of the related scalefactor band remains unchanged after a subsequent calculation of the quantization, and when amp[sfb]=1, it indicates that the scalefactor sf[sfb] of the related scalefactor band is changed after a subsequent calculation of the quantization.

Step S30 calculates the quantization of the MDCT coefficients with the common scalefactor Csf and the individual scalefactors sf[sfb], at this instant, applied to the frequency domain values, and calculates the quantization error level of each of the scalefactor bands sfb based on the quantized frequency domain values.

After the step S30 is performed, step S31 determines whether there are violating scalefactor bands sfb having a distortion that exceeds the allowed distortion levels of the related bands. In the violating scalefactor bands, the quantization error level is larger than the allowed distortion level.

When the result at the step S31 is affirmative, step S32 increments the scalefactors sf[sfb] (sf[sfb]=sf[sfb]+1) for the violating scalefactor bands having a distortion that exceed the allowed distortion levels of the related bands, and sets the information bits amp[sfb] to one (amp[sfb]=1) for such scalefactor bands where the scalefactors are changed. After the step S32 is performed, the above steps S30 and S31 are repeated until the check of the masking requirement is completed. The loop process including the steps S30 through S32 relates to the check of the masking requirement, and it is called the second control loop.

Hence, in the method of the present embodiment, after the scalefactors for the violating subbands are changed, only the check of the masking requirement (the second control loop) is repeated without performing the check of the bit rate requirement, and it is possible to speedily carry out the check of the masking requirement for all the scalefactor bands.

When the result at the step S31 is negative, there is no scalefactor band having a distortion that exceeds the allowed distortion levels of the related bands. Step S33 determines whether at least one scalefactor band has the information bit amp[sfb] that is larger than zero (any of amp[sfb]>0). If there is at least one scalefactor band where the information bit amp[sfb] is equal to 1, the bit rate requirement that the count of needed bits is less than the count of available bits might be violated as a result of the calculation of the quantization at the step S30.

When the result at the step S33 is affirmative, it is determined that the bit rate requirement is not met, and the above steps S24 through S33 are repeated until all the information bits amp[sfb] are equal to 0. Hence, in the method of the present embodiment, the first control loop, including the calculation of a quantization of the frequency domain values and the check of the bit rate requirement, and the second control loop, including the calculation of a quantization noise for each subband and the check of the masking requirement, are alternately performed when controlling the bit allocation for the related block, such that both the bit rate requirement and the masking requirement are met.

When the result at the step S33 is negative, it is determined that both the bit rate requirement and the masking requirement are met. The control of the bit allocation is normally terminated if there is no scalefactor band with higher than the allowed distortion level. However, this is not always possible to obtain. In such a case, the above step S33 includes, in addition to the checks of the bit rate and masking requirements, termination conditions for termination of the audio coding quantization method. In the above step S30, if the scalefactors for all the scalefactor bands are already changed, the audio coding and quantization method is terminated. Further, if the difference between two consecutive scalefactors is larger than a given upper limit, the audio coding and quantization method is terminated. There might be an additional condition which terminates the audio coding and quantization method in case of a lack of the computing time.

In the above-described embodiment, the steps S24 through S26 relate to the check of the bit rate requirement that the count of needed bits is less than the count of available bits. The steps S30 through S32 relate to the check of the masking requirement that the quantization error level is less than the allowed distortion level. When both the bit rate requirement and the masking requirement can be met, the common scalefactor Csf and the individual scalefactors sf[sfb] at the instant are stored, and an output vector of quantized frequency domain values is finally produced based on the stored scaling factors.

In the above-described embodiment, when the masking requirement cannot be met and the above step S33 is forcefully terminated based on the termination conditions, the quantization of the MDCT coefficients for the audio signal is calculated based on the common scalefactor Csf and the individual scalefactors sf[sfb] read from the optimum scalefactor memory areas (refer to the step S28). The step S33 in the audio coding and quantization method of FIG. 5 is not always normally terminated with the bit allocation being optimized. There may be a case in which the coding quality is degraded with the allocated bits. To reliably prevent the degradation of coding quality and speedily optimize the bit allocation, the steps S23, S27 and S28 in the present embodiment are useful for producing the output vector of quantized frequency domain values based on the optimum bit allocation data, even when the masking requirement cannot be met.

In the above-described embodiment, when at least one scalefactor band has the information bit amp[sfb] that is set to one, it is determined that the bit rate requirement might be violated. When all the scalefactor bands have the information bits amp[sfb] that are set to zero, it is determined that both the bit rate requirement and the masking requirement are finally met.

In the above-described embodiment, the parameter Rt of the audio signal is calculated every time the calculation of the quantization (the first control loop) is completed, and the parameter Rt is represented by a sum of the individual quantization error levels divided by the allowed distortion level of each scalefactor band, for all the scalefactor bands. However, the present invention is not limited to this embodiment. For example, the parameter Rt may be represented by a sum of the individual quantization error levels divided by the allowed distortion level of each scalefactor band, for only the scalefactor bands where the quantization error level is larger than the allowed distortion level of the related scalefactor band. Alternatively, the parameter Rt may be represented by a sum of the individual quantization error levels for all the scalefactor bands. Alternatively, the parameter Rt may be represented by a sum of the individual quantization error levels for only the scalefactor bands where the quantization error level is larger than the allowed distortion level of the related scalefactor band. Alternatively, the parameter Rt is represented by the number of the scalefactor bands where the quantization error level is larger than the allowed distortion level of the related scalefactor band. Alternatively, the parameter Rt may be represented by the count of bits needed to encode the bitstream.

Further, in the above-described embodiment, the parameter Rt is represented by a sum of the individual quantization error levels divided by the allowed distortion level of each scalefactor band, for all the scalefactor bands, and the reference constant R is set to an adequately large value in the step S23. The reference constant R is provided to check the parameter Rt by comparison with the reference constant R. As described above, several representations of the parameter Rt may be possible. Depending on the kind of the representations of the parameter Rt, the reference constant R may be set to an adequately small value in the step S23. In such a case, the comparison of the step S28 may be altered to check if the parameter Rt is larger than the reference constant R (Rt>R).

As described above, in the audio coding and quantization method of the present invention, when controlling the bit allocation for each subband, the first control loop and the second control loop are alternately performed for each block such that both the bit rate requirement and the masking requirement are met. After both the requirements are met, an output vector of quantized frequency domain values is finally produced. A total number of executions of the loop processes needed to optimize the bit allocation is remarkably reduced, and it is possible to speedily reach the convergence. Therefore, the audio coding quantization method of the present invention is effective in providing high coding quality without providing high signal-to-noise ratios. It is possible to speedily carry out the iterative process that converges when the total bit count is within some interval surrounding the allocated bit count, while preventing the degradation of coding quality due to nonconvergence.

Further, in the audio coding and quantization method of the present invention, when the check of the masking requirement is done, the quantization error levels of all the scalefactor bands are always less than the allowed distortion levels. When the bit rate requirement and the masking requirement are finally met, it requires only a small computing time until the convergence is reached. The total number of executions of the bit allocation control is remarkably reduced, and it is possible to speedily reach the convergence. Hence, the audio coding and quantization method of the present invention can speedily carry out the iterative process that converges when the total bit count is within some interval surrounding the allocated bit count, while preventing the degradation of coding quality due to nonconvergence.

Further, the present invention is not limited to the above-described embodiments, and variations and modifications may be made without departing from the scope of the present invention.

What is claimed is:

1. An audio coding and quantization method comprising the steps of:
   converting each of blocks of an input audio signal into a number of spectral subband components, the blocks being produced from the signal along a time axis;
   converting a related one of the blocks into an input vector of frequency domain values;
   quantizing each subband component whereby the number of quantizer levels for a related one of spectral subbands is obtained from a bit allocation;
   controlling the bit allocation for each subband by using a psychoacoustic model which generates an allowed distortion level of a related one of scalefactor bands corresponding to the subbands;

calculating, during the controlling step, a quantization of the frequency domain values of the related block through a first control loop, the first control loop being repeated until a bit rate requirement is met that a count of bits needed to encode a bitstream is less than a count of bits available to encode the bitstream; and calculating, through a second control loop, a quantization noise for each subband, produced by the quantization of the frequency domain values within the first control loop, the second control loop being repeated until a masking requirement is met that a quantization error level of the frequency domain values with scalefactors applied to the values within the scalefactor bands is less than the allowed distortion level, wherein the first control loop and the second control loop are alternately performed for the related block such that both the bit rate requirement and the masking requirement are met, and, after both the requirements are met, an output vector of quantized frequency domain values is produced.

2. The method according to claim 1, wherein the count of available bits is predetermined based on a given encoding bit rate, and, during the first calculating step, the first control loop is repeated until the bit rate requirement is met.

3. An audio coding and quantization method comprising the steps of:

converting each of blocks of an input audio signal into a number of spectral subband components, the blocks being produced from the signal along a time axis;

converting a related one of the blocks into an input vector of frequency domain values;

quantizing each subband component whereby the number of quantizer levels for a related one of spectral subbands is obtained from a bit allocation;

controlling the bit allocation for each subband by using a psychoacoustic model which generates an allowed distortion level of a related one of scalefactor bands corresponding to the subbands;

calculating, during the controlling step, a quantization of the frequency domain values of the related block through a first control loop, the first control loop being repeated until a bit rate requirement is met that a count of bits needed to encode a bitstream is less than a count of bits available to encode the bitstream; and calculating, through a second control loop, a quantization noise for each subband, produced by the quantization of the frequency domain values within the first control loop, the second control loop being repeated until a masking requirement is met that a quantization error level of the frequency domain values with scalefactors applied to the values within the scalefactor bands is less than the allowed distortion level, wherein the first control loop and the second control loop are alternately performed for the related block such that both the bit rate requirement and the masking requirement are met, and, after both the requirements are met, an output vector of quantized frequency domain values is produced; and wherein said method further comprises the steps of: calculating a parameter of the audio signal based on the scalefactors applied to the frequency domain values within the scalefactor bands every time the calculation of the quantization of the frequency domain values of each block through the first control loop is completed; and storing the parameter after completion of the calculation thereof.

4. The method according to claim 3, further comprising the steps of:

setting a reference constant to one of an adequately large value or an adequately small value before starting the quantizing step; and comparing the stored parameter with the reference constant after completion of the storing step, wherein, when the reference constant is set to the large value and the stored parameter is smaller than the reference constant, the reference constant is set to the stored parameter for a subsequent cycle of the comparing step, and wherein, when the reference constant is set to the small value and the stored parameter is larger than the reference constant, the reference constant is set to the stored parameter for a subsequent cycle of the comparing step.

5. The method according to claim 4, wherein, when the reference constant is set to the large value and the stored parameter is smaller than the reference constant, the scalefactors calculated at such an instant are stored into optimum scalefactor memory areas, and wherein, when the reference constant is set to the small value and the stored parameter is larger than the reference constant, the scalefactors calculated at such an instant are stored in the optimum scalefactor memory areas.

6. The method according to claim 1, wherein termination conditions, in addition to the bit rate requirement and the masking requirement, are checked for termination of the second control loop when the masking requirement cannot be met.

7. The method according to claim 1, wherein, when both the bit rate requirement and the masking requirement can be met, bit allocation data that is based on the scalefactors finally applied to the frequency domain values within the scalefactor bands, is stored in order to produce the output vector of quantized frequency domain values.

8. The method according to claim 5, wherein, when the masking requirement cannot be met and the second control loop is forcefully terminated based on termination conditions, the quantization of the frequency domain values is calculated based on the scalefactors read from the optimum scalefactor memory areas, in order to produce the output vector of quantized frequency domain values.

9. The method according to claim 3, wherein the parameter is calculated every time the calculation of the quantization is completed, and the parameter is represented by a sum of the individual quantization error levels divided by the allowed distortion level of each scalefactor band, for all the scalefactor bands.

10. The method according to claim 3, wherein the parameter is calculated every time the calculation of the quantization is completed, and the parameter is represented by a sum of the individual quantization error levels divided by the allowed distortion level of each scalefactor band, for only the scalefactor bands where the quantization error level is larger than the allowed distortion level of the related scalefactor band.

11. The method according to claim 3, wherein the parameter is calculated every time the calculation of the quantization is completed, and the parameter is represented by a sum of the individual quantization error levels for all the scalefactor bands.

12. The method according to claim 3, wherein the parameter is calculated every time the calculation of the quantization is completed, and the parameter is represented by a sum of the individual quantization error levels for only the scalefactor bands where the quantization error level is larger than the allowed distortion level of the related scalefactor band.

13. The method according to claim 3, wherein the parameter is calculated every time the calculation of the quantization is completed, and the parameter is represented by the number of the scalefactor bands where the quantization error level is larger than the allowed distortion level of the related scalefactor band.

14. The method according to claim 3, wherein the parameter is calculated every time the calculation of the quantization is completed, and the parameter is represented by the count of bits needed to encode the bitstream.

* * * * *